A. M. MICHAEL.
Stump-Extracting Machine
No. 207,541.  Patented Aug. 27, 1878.
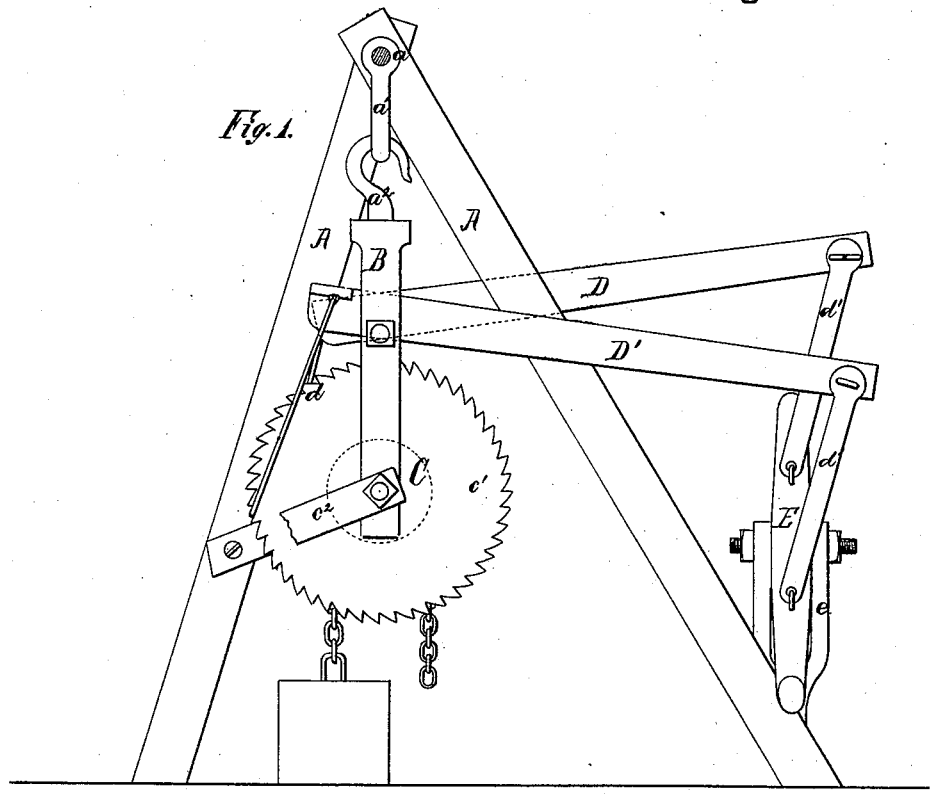
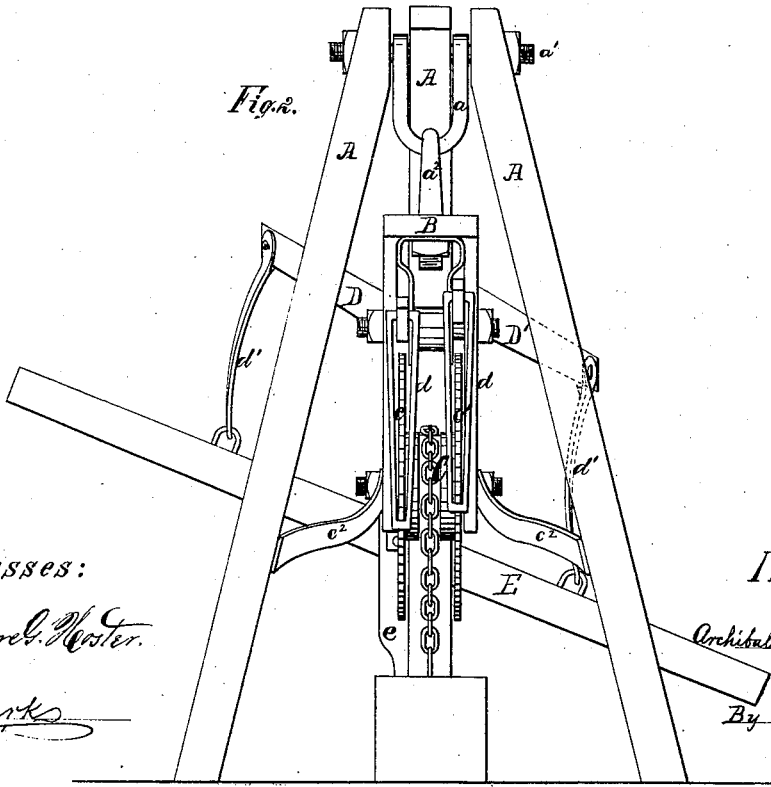
Witnesses:
Theodore G. Hoster
B. Clark
Inventor:
Archibald M. Michael
By Fitch & Fitch
Attys.

UNITED STATES PATENT OFFICE.

ARCHIBALD M. MICHAEL, OF LAPEER, MICHIGAN, ASSIGNOR OF ONE-HALF HIS RIGHT TO GEORGE H. CLARK, OF SAME PLACE.

IMPROVEMENT IN STUMP-EXTRACTING MACHINES.

Specification forming part of Letters Patent No. 207,541, dated August 27, 1878; application filed February 19, 1878.

*To all whom it may concern:*

Be it known that I, ARCHIBALD M. MICHAEL, of Lapeer, county of Lapeer, in the State of Michigan, have invented an Improved Stump-Extracting Machine, of which the following is a full, clear, and exact description, reference being had to the accompanying drawings, forming part of this specification.

My invention relates to a machine for drawing or extracting from the soil the stumps of trees, and can be used for other similar purposes; and it consists in the devices and their combinations hereinafter particularly set forth and claimed.

Figure 1 is a side elevation of a machine embodying my invention. Fig. 2 is a rear-end elevation of the same.

A A A are the supporting-frame, made in the form of a tripod, and bolted together at the top, so that the supports may be folded together in the same plane. At the apex or top of the frame is hung a stirrup, $a$, suspended on the connecting or hinge bolt $a^1$, and to this stirrup, by a suitable hook, $a^2$, the mechanism employed is suspended, as shown. In a frame, B, carried by the said hook, the chain-wheel or pulley C has bearings, the said pulley being provided with the ratchet or toothed wheels $c$ and $c^1$, one on each side, in said frame, as shown, and secured to said pulley. The said frame is preferably braced to the supports by the removable stays $c^2$, as shown. In the upper part of the frame B are pivoted the two levers D D', one on each side, to the short arms of which are hinged the links $d$, which depend therefrom, one engaging each of the ratchet-wheels $c$ and $c^1$, respectively, and the long arms of which extend forward beyond the supports, and are yoked by connecting-rods $d'$ to a beam, E, which is pivoted midway between its ends in a suitable standard or support, $e$.

Now, it is evident that, when the beam E is rocked on its pivot, the levers D and D' will be alternately oscillated, and by the links $d$ engaging the ratchet-wheels $c$ and $c'$ the said wheels will be alternately moved through the space of one of their teeth, the wheel $c$ being moved by the link of the lever D while the link of the lever D' is descending along the wheel $c^1$, and vice versa, thus maintaining a continuous rotation of the chain-pulley C. By means of this arrangement of the chain pulley, the ratchet-wheels, and the alternately moving levers, with their links, it is evident that I avoid entirely the use of pawls or dogs to hold the chain-pulley during its rotation. It is also evident that a steady and continuous pull or strain upon the chain employed to lift or extract the stump or similar object will be maintained.

I do not intend to claim, broadly, in a stump-extracting machine, a double-ratchet chain-pulley and its operating oscillating links or pawls, as I am aware that these devices have been hitherto employed; but I desire to be understood to limit my claim hereunder to the specific devices described, and in combination with the mechanism, for the purpose specified.

What I claim as my invention, and desire to secure by Letters Patent, is—

In combination, in a stump-extracting machine, the chain-pulley C, having ratchet-wheels $c$ and $c^1$, and levers D D', with links or pawls $d\,d$, suspended in frame B, together with lever E, in frame $e$, with connecting-rods $d'\,d'$, arranged to operate as and for the purpose specified.

ARCHIBALD M. MICHAEL.

Witnesses:
   J. R. WHITE,
   J. B. MOORE.